(12) United States Patent
Zhang (10) Patent No.: US 10,910,853 B2
(45) Date of Patent: *Feb. 2, 2021

(54) QUICK CHARGING METHOD, POWER ADAPTER AND MOBILE TERMINAL

(71) Applicant: GUANGDONG OPPO MOBILE TELECOMMUNICATIONS CORP., LTD., Guangdong (CN)

(72) Inventor: Jialiang Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/849,773

(22) Filed: Apr. 15, 2020

(65) Prior Publication Data

US 2020/0244085 A1   Jul. 30, 2020

Related U.S. Application Data

(63) Continuation of application No. 16/196,474, filed on Nov. 20, 2018, now Pat. No. 10,658,854, which is a
(Continued)

(51) Int. Cl.
*H02J 7/00* (2006.01)
*H01M 10/44* (2006.01)
(Continued)

(52) U.S. Cl.
CPC .......... *H02J 7/0044* (2013.01); *H01M 10/44* (2013.01); *H01M 10/486* (2013.01); *H02J 7/00* (2013.01);
(Continued)

(58) Field of Classification Search
CPC .................................................. H02J 7/0044
(Continued)

(56) References Cited

U.S. PATENT DOCUMENTS 6,445,936 B1 * 9/2002 Cannon ............ H02J 7/00
455/573
9,158,325 B1 * 10/2015 Lim ............... G05F 5/00
(Continued)

FOREIGN PATENT DOCUMENTS

CN    102957193 A    3/2013
CN    103475068 A   12/2013
(Continued)

OTHER PUBLICATIONS

PCT/CN2015/078898 International Search Report and Written Opinion dated Aug. 17, 2015, 7 pages.
(Continued)

*Primary Examiner* — Jerry D Robbins
(74) *Attorney, Agent, or Firm* — Lathrop GPM LLP (57) ABSTRACT

A quick charging method, a power adapter and a mobile terminal are provided. The method is applied to the power adapter, the power adapter is coupled to the mobile terminal through a USB interface, a power line in the USB interface is used by the power adapter to charge the mobile terminal, a data line in the USB interface is used by the power source adapter to conduct a bidirectional communication with the mobile terminal, and the power adapter supports a common charging mode and a quick charging mode, charging current of the quick charging mode is greater than that of the common charging mode. The method includes: conducting a bidirectional communication with the mobile terminal to determine to charge the mobile terminal in the quick charging mode; and adjusting charging current to charging current corresponding to the quick charging mode to charge the mobile terminal.

20 Claims, 3 Drawing Sheets

Related U.S. Application Data continuation of application No. 15/311,349, filed as application No. PCT/CN2015/078898 on May 13, 2015, now Pat. No. 10,505,380, which is a continuation-in-part of application No. PCT/CN2015/074049, filed on Mar. 11, 2015, which is a continuation-in-part of application No. PCT/CN2014/090846, filed on Nov. 11, 2014.

(51) Int. Cl.
  *H02J 7/04* (2006.01)
  *H01M 10/48* (2006.01)
  *H04W 24/02* (2009.01)

(52) U.S. Cl.
  CPC ............ *H02J 7/007* (2013.01); *H02J 7/0034* (2013.01); *H02J 7/04* (2013.01); *H04W 24/02* (2013.01); *H01M 2220/30* (2013.01); *H02J 7/00034* (2020.01); *H02J 7/00045* (2020.01)

(58) Field of Classification Search
  USPC ....................................................... 320/114
  See application file for complete search history.

(56) References Cited

U.S. PATENT DOCUMENTS

| | | | | |
|---|---|---|---|---|
| 2013/0285599 | A1 | 10/2013 | Hao | |
| 2014/0136863 | A1* | 5/2014 | Fritchman | H02J 2207/40 713/310 |
| 2014/0254050 | A1* | 9/2014 | Haines | H02H 3/162 361/42 |
| 2014/0257119 | A1* | 9/2014 | LeMay | G01R 27/02 600/509 |
| 2014/0300321 | A1* | 10/2014 | Kim | H02J 7/00036 320/111 |
| 2015/0194839 | A1* | 7/2015 | Wojcik | H02J 7/025 320/108 |
| 2016/0105038 | A1* | 4/2016 | Chi | H02J 7/007 320/107 |

FOREIGN PATENT DOCUMENTS

| | | |
|---|---|---|
| CN | 103762702 A | 4/2014 |
| CN | 103779907 A | 5/2014 |
| CN | 104065147 A | 9/2014 |
| CN | 104092274 A | 10/2014 |
| CN | 104135057 A | 11/2014 |
| EP | 2892214 A2 | 7/2015 |
| JP | 2007288889 A | 11/2007 |
| JP | 2007327772 A | 12/2007 |
| JP | 2012034554 A | 2/2012 |
| JP | 2012211860 A | 11/2012 |
| JP | 2013198262 A | 9/2013 |
| KR | 20140120699 A | 10/2014 |
| WO | WO 2013178191 A2 | 12/2013 |
| WO | WO 2014077978 A1 | 5/2014 |

OTHER PUBLICATIONS

Korean Patent Application No. 10-2018-7023953 Office Action dated Oct. 17, 2018, 6 pages.
Korean Patent Application No. 10-2018-7023953 English translation of Office Action dated Oct. 17, 2018, 5 pages.
Japanese Patent Application No. 2016-573754 Office Action, dated Dec. 28, 2017, 6 pages.
Japanese Patent Application No. 2016-573754 English translation of Office Action, dated Dec. 28, 2017, 6 pages.
Japanese Patent Application No. 2016-573754 Office Action, dated Mar. 8, 2018, 6 pages.
Japanese Patent Application No. 2016-573754 English translation of Office Action, dated Mar. 8, 2018, 4 pages.
Japanese Patent Application No. 2016-573754 Office Action, dated May 15, 2018, 4 pages.
Japanese Patent Application No. 2016-573754 English translation of Office Action, dated May 15, 2018, 4 pages.
Japanese Patent Application No. 2016-573754 Office Action, dated Jul. 25, 2019, 14 pages.
Japanese Patent Application No. 2016-573754 English translation of Office Action, dated Jul. 25, 2019, 13 pages.
Korean Patent Application No. 10-2016-7035468 Office Action dated Nov. 27, 2017, 6 pages.
Korean Patent Application No. 10-2016-7035468 English translation of Office Action dated Nov. 27, 2017, 5 pages.
Korean Patent Application No. 10-2016-7035468 Office Action dated May 15, 2017, 6 pages.
Korean Patent Application No. 10-2016-7035468 English translation of Office Action dated May 15, 2017, 4 pages.
European Patent Application No. 15858612.3 extended Search and Opinion dated Dec. 14, 2017, 8 pages.
European Patent Application No. 15858612.3 Office Action dated Feb. 18, 2020, 5 pages.
Indian Patent Application No. 201637042899 Office Action dated Apr. 8, 2019, 6 pages.
U.S. Appl. No. 16/196,474 Office Action dated Mar. 4, 2019, 25 pages.
U.S. Appl. No. 15/311,349 Office Action dated Dec. 11, 2018, 31 pages.
Malaysian Patent Application No. PI 2016704091 Office Action dated Sep. 18, 2019, 5 pages.
Singapore Patent Application No. 11201609424T Office Action dated Sep. 13, 2017, 10 pages.

\* cited by examiner

QUICK CHARGING METHOD, POWER ADAPTER AND MOBILE TERMINAL

CROSS-REFERENCE TO RELATED APPLICATIONS

This application is a continuation application of a U.S. application Ser. No. 16/196,474 filed Nov. 20, 2018, which is a continuation application of U.S. application Ser. No. 15/311,349, filed Nov. 15, 2016, which is a US national phase application based on International Application No. PCT/CN2015/078898, filed on May 13, 2015, which is based on and claims priority to International Application No. PCT/CN2014/090846, filed on Nov. 11, 2014, and International Application No. PCT/CN2015/074049, filed on Mar. 11, 2015, the entire contents of which are incorporated herein by reference.

FIELD

The present disclosure relates to charging technical field, and more particularly, to a quick charging method, a power adapter and a mobile terminal.

BACKGROUND

At present, a mobile terminal (such as a smart phone) has become increasingly popular among consumers, but the mobile terminal consumes a lot of electricity and needs to be charged frequently. With the increasing of battery capacity of the mobile terminal, the charging time becomes longer and longer. How to achieve quick charging has become a problem which needs to be solved.

In the related art, in order to achieve the quick charging, an output current of a power adapter is directly increased without considering the tolerance capacity of the mobile terminal, which may lead to a phenomenon of overheating or even burning out of the mobile terminal and decrease the life time of the mobile terminal.

SUMMARY

Embodiments of the present disclosure provide a quick charging method, a power adapter and a mobile terminal, so as to improve the security in the quick charging process.

In an embodiment, a quick charging method is provided. The method is applied to a power adapter, the power adapter is coupled to a mobile terminal through a universal serial bus (USB) interface, a power line in the USB interface is used by the power adapter to charge the mobile terminal, a data line in the USB interface is used by the power adapter to conduct a bidirectional communication with the mobile terminal, and the power adapter supports a common charging mode and a quick charging mode, in which a charging current of the quick charging mode is greater than that of the common charging mode. The method includes: conducting by the power adapter a bidirectional communication with the mobile terminal through the data line in the USB interface so as to determine to charge the mobile terminal in the quick charging mode; and adjusting by the power adapter a charging current to a charging current corresponding to the quick charging mode so as to charge the mobile terminal.

In an embodiment, a quick charging method is provided. The method is applied to a mobile terminal, the mobile terminal is coupled to a power adapter through a universal serial bus (USB) interface, a power line in the USB interface is configured to charge the mobile terminal, a data line in the USB interface is used by the mobile terminal to conduct a bidirectional communication with the power adapter, and the mobile terminal supports a common charging mode and a quick charging mode, in which a charging current of the quick charging mode is greater than that of the common charging mode. The method includes: conducting by the mobile terminal a bidirectional communication with the power adapter through the data line in the USB interface such that the power adapter determines to charge the mobile terminal in the quick charging mode; and receiving by the mobile terminal a charging current corresponding to the quick charging mode from the power adapter so as to charge a battery in the mobile terminal.

In an embodiment, a power adapter is provided. The power adapter is coupled to a mobile terminal through a universal serial bus (USB) interface, a power line in the USB interface is used by the power adapter to charge the mobile terminal, a data line in the USB interface is used by the power adapter to conduct a bidirectional communication with the mobile terminal, and the power adapter supports a common charging mode and a quick charging mode, in which a charging current of the quick charging mode is greater than that of the common charging mode. The power adapter includes: a communication circuit, configured to conduct a bidirectional communication with the mobile terminal through the data line in the USB interface so as to determine to charge the mobile terminal in the quick charging mode; and a current adjusting circuit, configured to adjust a charging current to a charging current corresponding to the quick charging mode so as to charge the mobile terminal.

In an embodiment, a mobile terminal is provided. The mobile terminal is coupled to a power adapter through a universal serial bus (USB) interface, a power line in the USB interface is configured to charge the mobile terminal, a data line in the USB interface is used by the mobile terminal to conduct a bidirectional communication with the power adapter, and the mobile terminal supports a common charging mode and a quick charging mode, in which a charging current of the quick charging mode is greater than that of the common charging mode. The mobile terminal includes: a communication circuit, configured to conduct a bidirectional communication with the power adapter through the data line in the USB interface such that the power adapter determines to charge the mobile terminal in the quick charging mode; and a charging circuit, configured to receive a charging current corresponding to the quick charging mode from the power adapter so as to charge a battery in the mobile terminal.

BRIEF DESCRIPTION OF THE DRAWINGS

In order to make the technical solutions of embodiments of the present invention more clearly, the accompanying drawings used in the description of embodiments of the present invention are briefly described hereunder. Obviously, the described drawings are merely some embodiments of present invention. For persons skilled in the art, other drawings may be obtained based on these drawings without any creative work.

DETAILED DESCRIPTION

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

Figure 1:
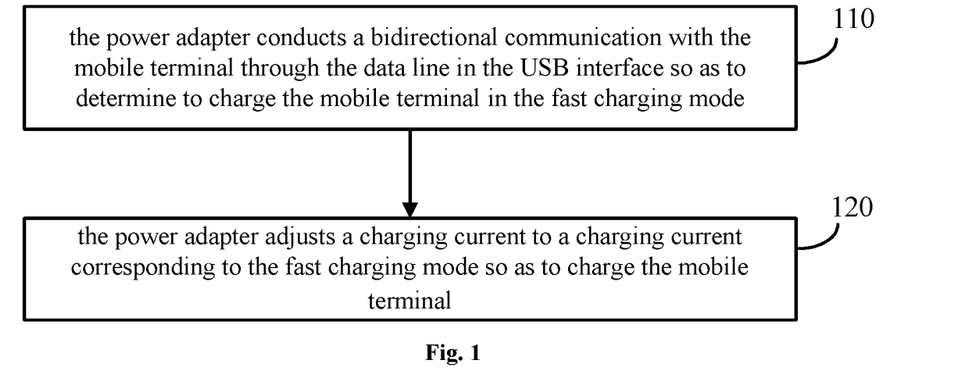
FIG. 1 is a schematic flow chart of a quick charging method according to an embodiment of the present disclosure.

FIG. 1 is a schematic flow chart of a quick charging method according to an embodiment of the present disclosure. The method shown in FIG. 1 is applied to a power adapter. The power adapter is coupled to a mobile terminal through a Universal Serial Bus (USB) interface, the USB interface may be a common USB interface or a micro USB interface. A power line in the USB interface is used by the power adapter to charge the mobile terminal, in which the power line in the USB interface may be a VBus line and/or a ground line in the USB interface. A data line in the USB interface is used by the power adapter to conduct a bidirectional communication with the mobile terminal, in which the data line may be a D+ line and/or a D− line in the USB interface, and the bidirectional communication may refer to an information interaction between the power adapter and the mobile terminal. The power adapter supports a common charging mode and a quick charging mode, in which a charging current of the quick charging mode is greater than that of the common charging mode. For example, the charging current of the common charging mode is generally less than 2.5 A, and the charging current of the quick charging mode may be greater than 3 A.

The method shown in FIG. 1 includes following acts.

At block 110, the power adapter conducts a bidirectional communication with the mobile terminal through the data line in the USB interface so as to determine to charge the mobile terminal in the quick charging mode.

In at least one embodiment, in a process that the power adapter and the mobile terminal negotiate whether the quick charging mode is adopted for charging the mobile terminal, the power adapter may only keep being coupled to the mobile terminal without performing a charging, or may charge the mobile terminal in the common charging mode, or may charge the mobile terminal with a low current, which is not limited in the present disclosure.

At block 120, the power adapter adjusts charging current to a charging current corresponding to the quick charging mode to charge the mobile terminal.

After determining to charge the mobile terminal in the quick charging mode, the power adapter may adjust the charging current to the charging current corresponding to the quick charging mode directly, or may negotiate with the mobile terminal about the charging current of the quick charging mode. For example, the charging current corresponding to the quick charging mode may be determined according to a current electric quantity of a battery in the mobile terminal.

In an embodiment of the present disclosure, the power adapter needs to conduct a bidirectional communication with the mobile terminal and negotiates whether a quick charging mode may be adopted, instead of blindly increasing the output current for performing a quick charging. Compared to the related art, the security in the quick charging process is improved.

In an embodiment, the act at block 110 may include: sending by the power adapter a first instruction to the mobile terminal, in which the first instruction is configured to ask the mobile terminal whether to start the quick charging mode; receiving by the power adapter a replying instruction of the first instruction from the mobile terminal, in which the replying instruction of the first instruction is configured to indicate that the mobile terminal agrees to start the quick charging mode.

In an embodiment, before the power adapter sends the first instruction to the mobile terminal, the method further includes: performing a charging between the power adapter and the mobile terminal in the common charging mode. Sending by the power adapter the first instruction to the mobile terminal, includes: after the power adapter determines that a charging time of the common charging mode is larger than a preset threshold, sending by the power adapter the first instruction to the mobile terminal.

In at least one embodiment, after the power adapter determines that the charging time of the common charging mode is larger than the preset threshold, the power adapter can consider that the mobile terminal has recognized it as a power adapter, and a quick charging inquiry communication can be started.

In an embodiment, sending by the power adapter the first instruction to the mobile terminal, includes: after the power adapter determines that the charging is performed for a preset time period with a charging current larger than or equal to a preset current threshold, sending by the power adapter the first instruction to the mobile terminal.

In an embodiment, before the act at block 120, the method shown in FIG. 1 further includes: conducting by the power adapter a bidirectional communication with the mobile terminal through the data line in the USB interface so as to determine a charging voltage corresponding to the quick charging mode; adjusting by the power adapter a charging voltage to the charging voltage corresponding to the quick charging mode.

In an embodiment, the act at block 110 may include: sending by the power adapter a second instruction to the mobile terminal, in which the second instruction is configured to ask whether a current voltage of the power adapter is suitable as a charging voltage of the quick charging mode; receiving by the power adapter a replying instruction of the second instruction sent by the mobile terminal, in which the replying instruction of the second instruction is configured to indicate that the current voltage of the power adapter is suitable, high or low; and determining by the power adapter the charging voltage of the quick charging mode according to the replying instruction of the second instruction.

In an embodiment, before the act at block 120, the method shown in FIG. 1 may further include: conducting by the power adapter a bidirectional communication with the mobile terminal through the data line in the USB interface so as to determine the charging current corresponding to the quick charging mode.

In an embodiment, conducting by the power adapter a bidirectional communication with the mobile terminal through the data line in the USB interface so as to determine the charging current corresponding to the quick charging mode, may include: sending by the power adapter a third instruction to the mobile terminal, in which the third instruction is configured to inquire a maximum charging current supported currently by the mobile terminal; receiving by the power adapter a replying instruction of the third instruction sent by the mobile terminal, in which the replying instruction of the third instruction is configured to indicate the maximum charging current supported currently by the mobile terminal; and determining by the power adapter the charging current of the quick charging mode according to the replying instruction of the third instruction.

The power adapter may determine the maximum charging current as the charging current of the quick charging mode directly, or set a current which is smaller than the maximum charging current as the charging current.

In an embodiment, the method shown in FIG. 1 may further include: in a process that the power adapter charges the mobile terminal in the quick charging mode, conducting by the power adapter a bidirectional communication with the mobile terminal through the data line in the USB interface to adjust the charging current of the power adapter continuously.

The power adapter may inquire a current working state of the mobile terminal continually so as to adjust the charging current continuously. For example, the power adapter may inquire a voltage, an electric quantity of the battery, or other information in the mobile terminal.

In an embodiment, conducting by the power adapter a bidirectional communication with the mobile terminal through the data line in the USB interface so as to adjust the charging current of the power adapter continuously, may include: sending by the power adapter a fourth instruction to the mobile terminal, in which the fourth instruction is configured to inquire a current voltage of a battery in the mobile terminal; receiving by the power adapter a replying instruction of the fourth instruction sent by the mobile terminal, in which the replying instruction of the fourth instruction is configured to indicate the current voltage of the battery in the mobile terminal; adjusting by the power adapter the charging current of the power adapter according to the current voltage of the battery.

In an embodiment, adjusting by the power adapter the charging current of the power adapter according to the current voltage of the battery, includes: adjusting by the power adapter the charging current of the power adapter to a charging current value corresponding to the current voltage of the battery according to the current voltage of the battery and preset correspondences between battery voltage values and charging current values.

In at least one embodiment, the power adapter may pre-store the correspondences between battery voltage values and charging current values.

In an embodiment, the method shown in FIG. 1 may further include: in a process that the power adapter charges the mobile terminal in the quick charging mode, conducting by the power adapter a bidirectional communication with the mobile terminal through the data line in the USB interface so as to determine whether a poor contact occurs in the USB interface; if it is determined that the poor contact occurs in the USB interface, quitting by the power adapter the quick charging mode.

In an embodiment, before the power adapter conducts a bidirectional communication with the mobile terminal through the data line in the USB interface so as to determine whether the poor contact occurs in the USB interface, the method shown in FIG. 1 may further include: receiving by the power adapter information for indicating a path impedance of the mobile terminal from the mobile terminal. Conducting by the power adapter a bidirectional communication with the mobile terminal through the data line in the USB interface so as to determine whether a poor contact occurs in the USB interface, includes: sending by the power adapter a fourth instruction to the mobile terminal, in which the fourth instruction is configured to inquire a voltage of a battery in the mobile terminal; receiving by the power adapter a replying instruction of the fourth instruction sent by the mobile terminal, in which the replying instruction of the fourth instruction is configured to indicate the voltage of the battery in the mobile terminal; determining by the power adapter a path impedance from the power adapter to the battery according to a charging voltage of the power adapter and the voltage of the battery; and determining by the power adapter whether the poor contact occurs in the USB interface according to the path impedance from the power adapter to the battery, the path impedance of the mobile terminal and a path impedance of a charging circuit between the power adapter and the mobile terminal.

The power adapter may pre-record the path impedance 1 of the mobile terminal, for example, since the structures of mobile terminals with a same model number are the same, the path impedances of the mobile terminals may be set as the same value when configuring the factory settings. Similarly, the power adapter may pre-record the path impedance 2 of the charging circuit. When the power adapter acquires the voltage between two ends of the battery in the mobile terminal, the path impedance 3 of the whole path may be determined according to the voltage drop from the power adapter to each of the two ends of the battery. If path impedance 3>path impedance 1+path impedance 2, or path impedance 3−(path impedance 1+path impedance 2)>impedance threshold, then it may be considered that a poor contact occurs in the USB interface.

In an embodiment, before the power adapter quits the quick charging mode, the method shown in FIG. 1 may further include: sending by the power adapter a fifth instruction to the mobile terminal, in which the fifth instruction is configured to indicate that a poor contact occurs in the USB interface.

After the fifth instruction is sent, the power adapter quits the quick charging mode or is reset.

Hereinbefore, by referring to FIG. 1, the quick charging method according to embodiments of the present disclosure is described in detail from the aspect of a power adapter. In the following, the quick charging method according to embodiments of the present disclosure will be described from the aspect of a mobile terminal by referring to FIG. 2.

In embodiments, the interaction between a power adapter and a mobile terminal, related features and functionality described from the mobile terminal side corresponds to the description from the power adapter side. For the sake of simplicity, repetitive description may be omitted properly.

Figure 2:
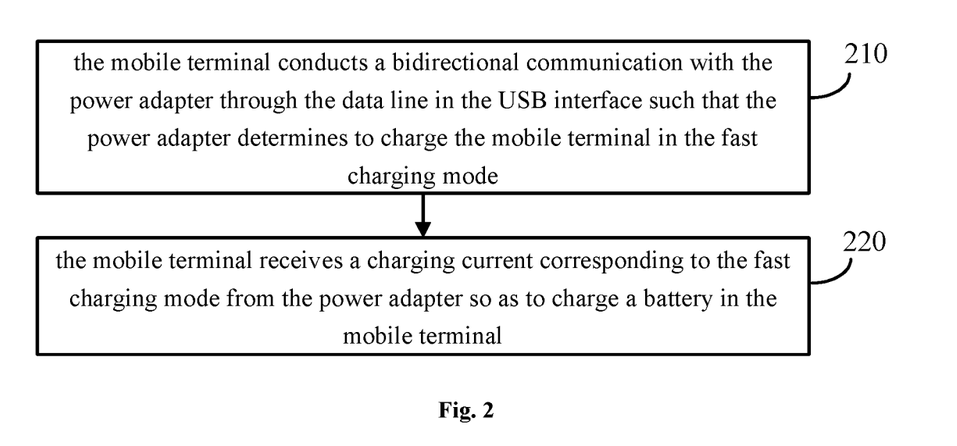
FIG. 2 is a schematic flow chart of a quick charging method according to an embodiment of the present disclosure.

FIG. 2 is a schematic flow chart of a quick charging method according to an embodiment of the present disclosure. The method shown in FIG. 2 is applied to a mobile terminal, the mobile terminal is coupled to a power adapter through a USB interface, a power line in the USB interface is configured to charge the mobile terminal, a data line in the USB interface is used by the mobile terminal to conduct a bidirectional communication with the power adapter, and the mobile terminal supports a common charging mode and a quick charging mode, in which a charging current of the quick charging mode is greater than that of the common charging mode. The method shown in FIG. 2 includes following acts.

At block 210, the mobile terminal conducts a bidirectional communication with the power adapter through the data line in the USB interface such that the power adapter determines to charge the mobile terminal in the quick charging mode.

At block 220, the mobile terminal receives a charging current corresponding to the quick charging mode from the power adapter so as to charge a battery in the mobile terminal.

In embodiments of the present disclosure, the power adapter needs to conduct a bidirectional communication with the mobile terminal and negotiates whether a quick charging mode may be adopted, instead of blindly increasing the output current for performing a quick charging. Compared to the related art, the security in the quick charging process is improved.

In an embodiment, conducting by the mobile terminal a bidirectional communication with the power adapter through the data line in the USB interface such that the power adapter determines to charge the mobile terminal in the quick charging mode, includes: receiving by the mobile terminal a first instruction sent by the power adapter, in which the first instruction is configured to ask the mobile terminal whether to start the quick charging mode; sending by the mobile terminal a replying instruction of the first instruction to the power adapter, in which the replying instruction of the first instruction is configured to indicate that the mobile terminal agrees to start the quick charging mode.

In an embodiment, before the mobile terminal receives the first instruction sent by the power adapter, the method further includes: performing a charging between the mobile terminal and the power adapter in the common charging mode. Receiving by the mobile terminal a first instruction sent by the power adapter, includes: after the power adapter determines that a charging time of the common charging mode is larger than a preset threshold, receiving by the mobile terminal the first instruction sent by the power adapter.

In an embodiment, before the mobile terminal receives the charging current corresponding to the quick charging mode from the power adapter so as to charge the battery in the mobile terminal, the method includes: conducting by the mobile terminal a bidirectional communication with the power adapter through the data line in the USB interface such that the power adapter determines a charging voltage corresponding to the quick charging mode.

In an embodiment, conducting by the mobile terminal a bidirectional communication with the power adapter through the data line in the USB interface such that the power adapter determines a charging voltage corresponding to the quick charging mode, includes: receiving by the mobile terminal a second instruction sent by the power adapter, in which the second instruction is configured to ask whether a current voltage of the power adapter is suitable as the charging voltage of the quick charging mode; sending by the mobile terminal a replying instruction of the second instruction to the power adapter, in which the replying instruction of the second instruction is configured to indicate that the current voltage of the power adapter is suitable, high or low.

In an embodiment, before the mobile terminal receives the charging current corresponding to the quick charging mode from the power adapter so as to charge the battery in the mobile terminal, the method includes: conducting by the mobile terminal a bidirectional communication with the power adapter through the data line in the USB interface such that the power adapter determines the charging current corresponding to the quick charging mode.

In an embodiment, conducting by the mobile terminal a bidirectional communication with the power adapter through the data line in the USB interface such that the power adapter determines the charging current corresponding to the quick charging mode, includes: receiving by the mobile terminal a third instruction sent by the power adapter, in which the third instruction is configured to inquire a maximum charging current supported currently by the mobile terminal; sending by the mobile terminal a replying instruction of the third instruction to the power adapter, in which the replying instruction of the third instruction is configured to indicate the maximum charging current supported currently by the mobile terminal, such that the power adapter determines the charging current corresponding to the quick charging mode according to the maximum charging current.

In an embodiment, the method further includes: in a process that the power adapter charges the mobile terminal in the quick charging mode, conducting by the mobile terminal a bidirectional communication with the power adapter through the data line in the USB interface such that the power adapter adjusts the charging current of the power adapter continuously.

In an embodiment, conducting by the mobile terminal a bidirectional communication with the power adapter through the data line in the USB interface such that the power adapter adjusts the charging current of the power adapter continuously, includes: receiving by the mobile terminal a fourth instruction sent by the power adapter, in which the fourth instruction is configured to inquire a current voltage of a battery in the mobile terminal; sending by the mobile terminal a replying instruction of the fourth instruction to the power adapter, in which the replying instruction of the fourth instruction is configured to indicate the current voltage of the battery in the mobile terminal, such that the power adapter adjusts the charging current of the power adapter continuously according to the current voltage of the battery.

In an embodiment, the method further includes: in a process that the power adapter charges the mobile terminal in the quick charging mode, conducting by the mobile terminal a bidirectional communication with the power adapter through the data line in the USB interface, such that the power adapter determines whether a poor contact occurs in the USB interface.

In an embodiment, conducting by the mobile terminal a bidirectional communication with the power adapter through the data line in the USB interface, such that the mobile terminal determines whether a poor contact occurs in the USB interface, includes: receiving by the mobile terminal a fourth instruction sent by the power adapter, in which the fourth instruction is configured to inquire a current voltage of a battery in the mobile terminal; sending by the mobile terminal a replying instruction of the fourth instruction to the power adapter, in which the replying instruction of the fourth instruction is configured to indicate the current voltage of the battery in the mobile terminal, such that the power adapter determines whether the poor contact occurs in the USB interface according to a charging voltage of the power adapter and the current voltage of the battery.

In an embodiment, the method further includes: receiving by the mobile terminal a fifth instruction sent by the power adapter, in which the fifth instruction is configured to indicate that the poor contact occurs in the USB interface.

In combination with specific examples, embodiments of the present disclosure will be described below in more detail. It should be noted that, examples shown in FIG. 3 to FIG. 4 merely help those skilled in the arts for understanding embodiments of the present disclosure, instead of limiting the embodiments of the present disclosure to illustrated specific values or scenarios. Obviously, various equivalent modifications and changes may be made according to the examples shown in FIG. 3 to FIG. 4 by those skilled in the arts, and the modifications or changes shall fall in the protection scope of the present invention.

Figure 3:
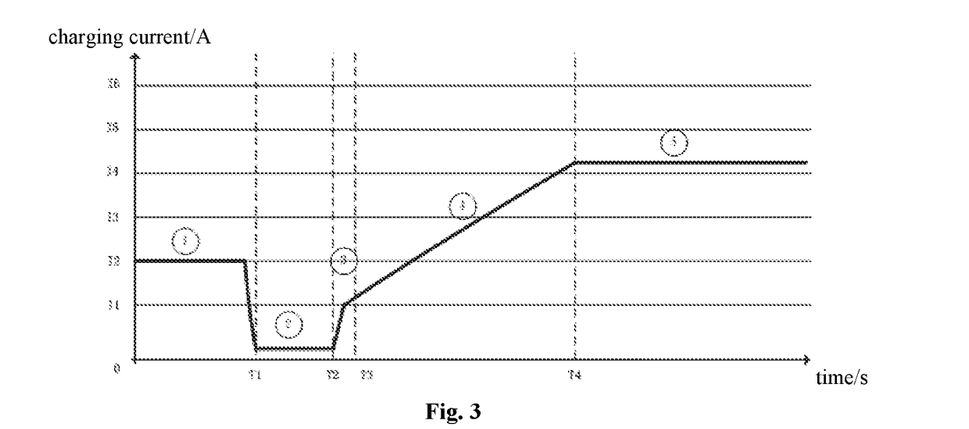
FIG. 3 is a schematic diagram of a process of starting the quick charging according to an embodiment of the present disclosure.

FIG. 3 is a schematic diagram of a starting process of the quick charging according to an embodiment of the present disclosure.

As illustrated in FIG. 3, the process of starting a quick charging includes five stages.

Stage 1

If the power adapter detects that the output current in a continuous time period T1 is larger than or equal to I2, it is considered that the type recognition of the power adapter performed by the mobile terminal is finished (i.e. a device charging the mobile terminal is recognized as the power adapter, rather than other electric appliances such as a computer, etc.), the communication is started and instruction 1 is sent to ask the mobile terminal whether to start the quick charging (or flash charging), by the power adapter. If the power adapter receives a reply indicating that the mobile terminal disagrees with the quick charging, the current may be detected repeatedly. If the current is still larger than or equal to I2, the request may be sent again by the power adapter, and that cycle repeats until the mobile terminal provides a reply indicating the mobile terminal agrees to perform the quick charging or until the current no longer satisfies the condition of that the current is larger than or equal to I2. After the mobile terminal agrees to perform the quick charging, the process goes to stage 2.

Stage 2

The power adapter sends instruction 2 to ask the mobile terminal whether the voltage of the power adapter is suitable. If the mobile terminal provides a reply indicating that the voltage is high or low, the voltage is adjusted correspondingly and the mobile terminal is again asked by the power adapter whether the voltage of the power adapter is suitable, and that cycle repeats until the mobile terminal provides a reply indicating the voltage is at a suitable position. And then, the process goes to stage 3.

Stage 3

After the power adapter receives a reply indicating that the voltage of the power adapter is suitable from the mobile terminal, the power adapter sends instruction 3 for inquiring the maximum charging current supported currently by the mobile terminal. And then, the process goes to stage 4.

Stage 4, 5

The power adapter sets the output current with specified values according to the current value replied by the mobile terminal and the process goes to a constant current stage. At the same time, the power adapter sends instruction 4 at regular intervals for inquiring the battery voltage of the mobile terminal, and then it is judged according to the battery voltage whether the USB interface contacts well and whether it is required to decrease the charging current. If the power adapter judges that a poor contact occurs in the USB interface, instruction 5 is sent and a reset operation is performed thereafter.

In at least one embodiment, 1) in stage 1, when the mobile terminal provides the reply to the instruction 1, a path impedance of terminal may be attached in data of the reply, the path impedance of terminal may be used in stage 5 to judge the connection situation of the USB interface. 2) In stage 2, a time period from when the power adapter agrees to perform the quick charging to when the voltage of the power adapter is adjusted to a suitable value may be controlled within a certain range, so as to prevent the mobile terminal from being judged as abnormal and stopping the quick charging. 3) In stage 2, when the voltage of the power adapter is adjusted to a value higher than the battery voltage ΔV, the terminal can provide the reply indicating that the voltage is suitable (ΔV may be set as 200~500 mA). 4) In stage 4, an increasing speed of the output current may be controlled within a certain range, so as to avoid an abnormal interrupt of the quick charging due to an over-quick increasing speed of the charging current resulted from an over-quick increasing speed of the output current. In at least one embodiment, as illustrated in FIG. 3, the charging current increases gently in stage 4. 5) In stage 5, the control precision of the current in the constant current mode may be controlled within 5% to the greatest extent. 6) In stage 5, the power adapter detects the path impedance in real time, the impedance of the whole path for the quick charging may be computed by measuring the voltage of the power adapter, the current charging current and the read battery voltage. If the detected path impedance>path impedance of the terminal+ impedance of the data line for quick charging, it is considered that a poor contact occurs in the USB interface and the quick charging may be stopped. 7) After starting the quick charging, each interval between communications may be controlled within a certain range, so as to avoid an abnormal interrupt of the quick charging. 8) The termination of the quick charging may be divided into a recoverable type and a non-recoverable type. If the mobile terminal detects that the battery is fully charged or a poor contact occurs in the USB interface during the quick charging stage, the quick charging is stopped and the power adapter may not start the quick charging any more. If there is an abnormal communication between the power adapter and the mobile terminal, the power adapter may stop the quick charging, but the power adapter may re-start the quick charging process thereafter. If the power adapter detects that the battery is abnormal, the quick charging may be stopped, and the quick charging process may be re-started until the battery returns to normal.

Figure 4:
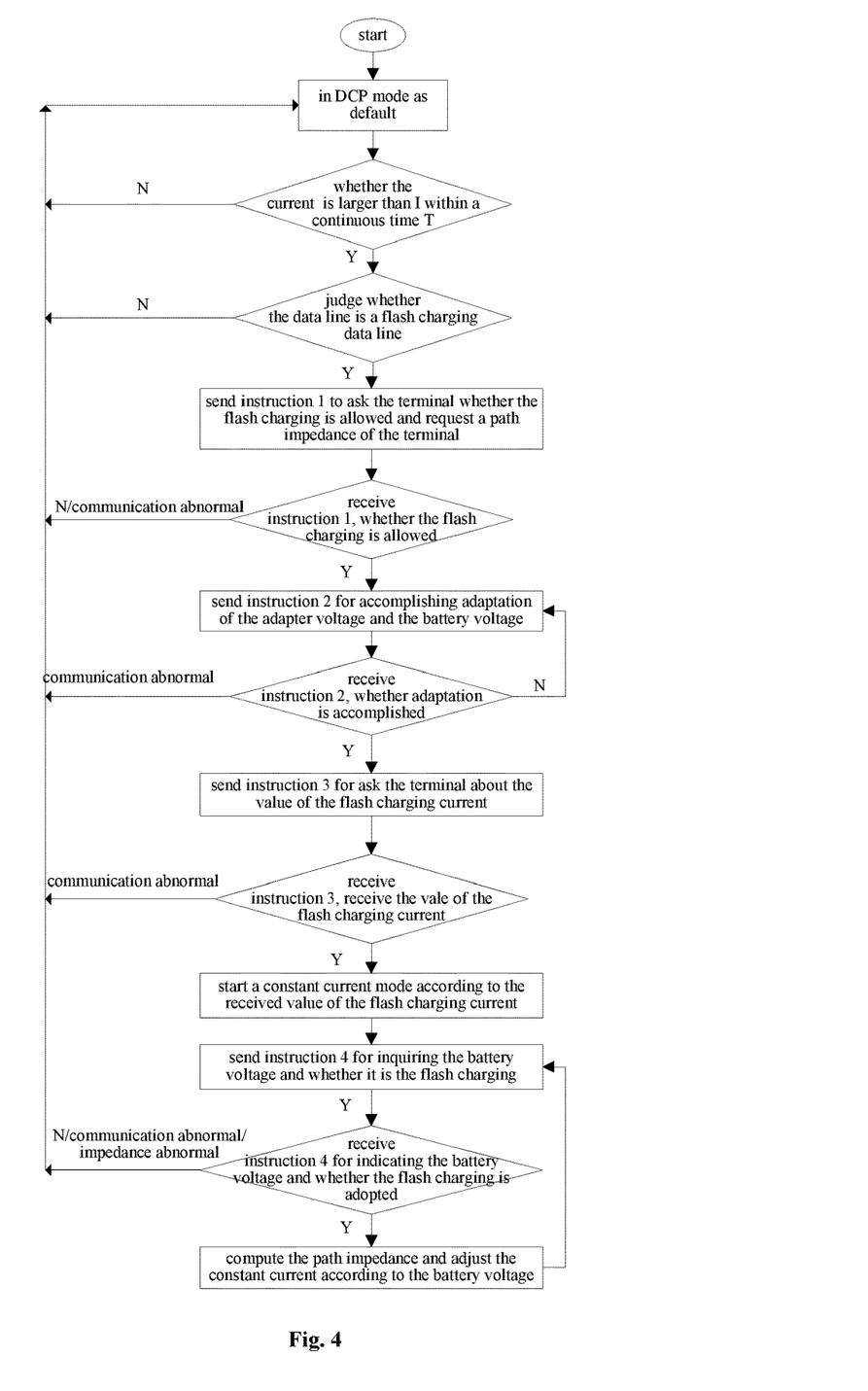
FIG. 4 is a schematic diagram of a quick charging process according to an embodiment of the present disclosure.

FIG. 4 illustrates an example of a quick charging process. The whole process illustrated in FIG. 4 substantially corresponds to the process illustrated in FIG. 3.

As illustrated in FIG. 4, the power adapter is in a DCP mode at beginning, that is, the power adapter is in a D+, D– short circuit mode, and the mobile terminal is charged in a common charging mode. Before sending the first instruction, the power adapter may judge whether the data line is a quick charging data line, which may be implemented in various ways. For example, an identification circuit may be added to the data line, and the power adapter may identify whether the data line is a quick charging data line by conducting an information interaction with the identification circuit. Additionally, in at least one embodiment, when there is an abnormal communication or abnormal impedance in the whole quick charging process, the power adapter may quit the quick charging process or be reset.

Hereinbefore, by referring to FIG. 1 to FIG. 4, the quick charging method according to an embodiment of the present disclosure is described in detail. In the following, the power adapter and the mobile terminal according to embodiments of the present disclosure will be described in detail hereinafter with reference to FIG. 5 to FIG. 6.

Figure 5:
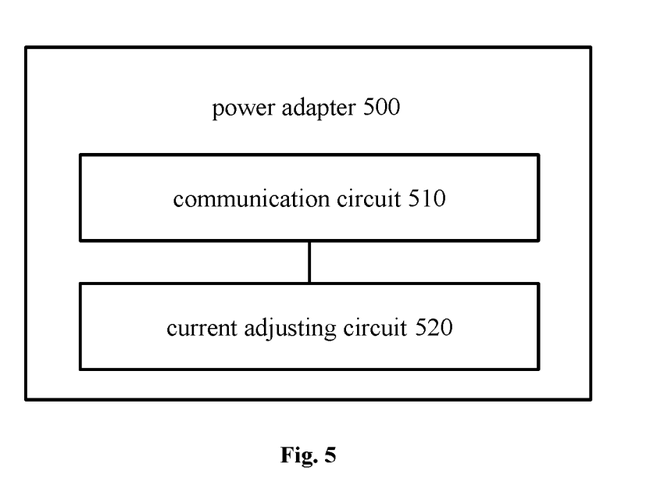
FIG. 5 is a schematic block diagram of a power adapter according to an embodiment of the present disclosure.

FIG. 5 is a schematic block diagram of a power adapter according to an embodiment of the present disclosure. The power adapter 500 shown in FIG. 5 can achieve respective act executed by the power adapter in FIG. 1 to FIG. 4, which is not described herein in order to avoid repetition.

In at least one embodiment, the power adapter 500 is coupled to a mobile terminal through a USB interface, a power line in the USB interface is used by the power adapter 500 to charge the mobile terminal, a data line in the USB interface is used by the power adapter 500 to conduct a bidirectional communication with the mobile terminal, and the power adapter 500 supports a common charging mode and a quick charging mode, in which a charging current of the quick charging mode is greater than that of the common charging mode. The power adapter 500 includes a communication circuit 510 and a current adjusting circuit 520.

The communication circuit 510 is configured to conduct a bidirectional communication with the mobile terminal through the data line in the USB interface so as to determine to charge the mobile terminal in the quick charging mode.

The current adjusting circuit 520 is configured to adjust a charging current to a charging current corresponding to the quick charging mode so as to charge the mobile terminal.

In embodiments of the present disclosure, the power adapter needs to conduct a bidirectional communication with the mobile terminal and negotiates whether a quick charging mode may be adopted, instead of blindly increasing the output current for performing a quick charging. Compared to the related art, the security in the quick charging process is improved.

In an embodiment, the communication circuit 510 is configured to send a first instruction to the mobile terminal, in which the first instruction is configured to ask the mobile terminal whether to start the quick charging mode; and to receive a replying instruction of the first instruction from the mobile terminal, in which the replying instruction of the first instruction is configured to indicate that the mobile terminal agrees to start the quick charging mode.

In an embodiment, the power adapter 500 further includes a power conversion circuit configured to perform a charging with the mobile terminal in the common charging mode. The communication circuit 510 is configured to send the first instruction to the mobile terminal after determining that a charging time of the common charging mode is larger than a preset threshold.

In an embodiment, the communication circuit 510 is further configured to conduct a bidirectional communication with the mobile terminal through the data line in the USB interface so as to determine a charging voltage corresponding to the quick charging mode. The power adapter 500 further includes a voltage adjusting circuit configured to adjust charging voltage to a charging voltage corresponding to the quick charging mode.

In an embodiment, the communication circuit 510 is further configured to send a second instruction to the mobile terminal, in which the second instruction is configured to ask whether a current voltage of the power adapter 500 is suitable as a charging voltage of the quick charging mode; and receive a replying instruction of the second instruction sent by the mobile terminal, in which the replying instruction of the second instruction is configured to indicate that the current voltage of the power adapter 500 is suitable, high or low. The voltage adjusting circuit is configured to determine the charging voltage of the quick charging mode according to the replying instruction of the second instruction.

In an embodiment, the communication circuit 510 is configured to conduct a bidirectional communication with the mobile terminal through the data line in the USB interface so as to determine a charging current corresponding to the quick charging mode.

In an embodiment, the communication circuit 510 is configured to send a third instruction to the mobile terminal, in which the third instruction is configured to inquire the maximum charging current supported currently by the mobile terminal; to receive a replying instruction of the third instruction sent by the mobile terminal, in which the replying instruction of the third instruction is configured to indicate the maximum charging current supported currently by the mobile terminal; and to determine the charging current of the quick charging mode according to the replying instruction of the third instruction.

In an embodiment, the communication circuit 510 is further configured to conduct a bidirectional communication with the mobile terminal through the data line in the USB interface in a process that the power adapter 500 charges the mobile terminal in the quick charging mode, so as to adjust the charging current of the power adapter 500 continuously.

In an embodiment, the communication circuit 510 is configured to send a fourth instruction to the mobile terminal, in which the fourth instruction is configured to inquire a current voltage of the battery in the mobile terminal; and to receive a replying instruction of the fourth instruction sent by the mobile terminal, in which the replying instruction of the fourth instruction is configured to indicate the current voltage of the battery in the mobile terminal. The current adjusting circuit 520 is configured to adjust the charging current of the power adapter according to the current voltage of the battery.

In an embodiment, the current adjusting circuit 520 is configured to adjust the charging current of the power adapter 500 to a charging current value corresponding to the current voltage of the battery according to the current voltage of the battery and preset correspondences between battery voltage values and charging current values.

In an embodiment, the communication circuit 510 is configured to conduct a bidirectional communication with the mobile terminal through the data line in the USB interface in a process that the power adapter charges the mobile terminal in the quick charging mode, so as to determine whether a poor contact occurs in the USB interface; and to quit the quick charging mode if it is determined that the poor contact occurs in the USB interface.

In an embodiment, the communication circuit 510 is configured to receive information for indicating a path impedance of the mobile terminal from the mobile terminal; to receive a replying instruction of the fourth instruction sent by the mobile terminal, in which the replying instruction of the fourth instruction is configured to indicate the voltage of the battery in the mobile terminal; to determine a path impedance from the power adapter 500 to the battery according to the charging voltage of the power adapter 500 and the voltage of the battery; and to determine whether the poor contact occurs in the USB interface according to the path impedance from the power adapter 500 to the battery, the path impedance of the mobile terminal and a path impedance of a charging line between the power adapter 500 and the mobile terminal.

In an embodiment, the communication circuit 510 is further configured to send a fifth instruction to the mobile terminal, in which the fifth instruction is configured to indicate that the poor contact occurs in the USB interface.

Figure 6:
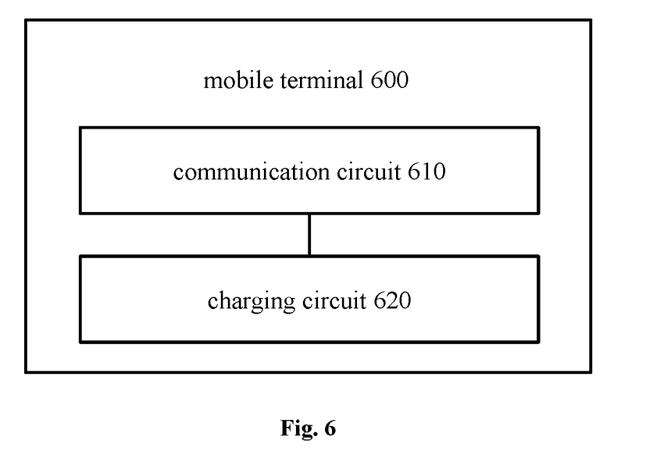
FIG. 6 is a schematic block diagram of a mobile terminal according to an embodiment of the present disclosure.

FIG. 6 is a schematic block diagram of a mobile terminal according to an embodiment of the present disclosure. The mobile terminal 600 illustrated in FIG. 6 is coupled to a power adapter through a USB interface, a power line in the USB interface is configured to charge the mobile terminal 600, a data line in the USB interface is used by the mobile terminal 600 to conduct a bidirectional communication with the power adapter, and the mobile terminal 600 supports a common charging mode and a quick charging mode, in which a charging current of the quick charging mode is greater than that of the common charging mode. The mobile terminal 600 includes a communication circuit 610 and a charging circuit 620.

The communication circuit 610 is configured to conduct a bidirectional communication with the power adapter through the data line in the USB interface such that the power adapter determines to charge the mobile terminal 600 in the quick charging mode.

The charging circuit 620 is configured to receive a charging current corresponding to the quick charging mode from the power adapter so as to charge a battery in the mobile terminal 600.

In embodiments of the present disclosure, the power adapter needs to conduct a bidirectional communication with the mobile terminal and negotiates whether a quick charging mode may be adopted, instead of blindly increasing the output current for conducting a quick charging. Compared to the related art, the security in the quick charging process is improved.

In an embodiment, the communication circuit 610 is configured to receive a first instruction sent by the power adapter, in which the first instruction is configured to ask the mobile terminal 600 whether to start the quick charging mode; and to send a replying instruction of the first instruction to the power adapter, in which the replying instruction of the first instruction is configured to indicate that the mobile terminal 600 agrees to start the quick charging mode.

In an embodiment, the charging circuit 620 is further configured to perform a charging with the power adapter in the common charging mode. The communication circuit 610 is configured to receive the first instruction sent by the power adapter after the power adapter determines that a charging time of the common charging mode is larger than a preset threshold.

In an embodiment, the communication circuit 610 is further configured to conduct a bidirectional communication with the power adapter through the data line in the USB interface such that the power adapter determines a charging voltage corresponding to the quick charging mode.

In an embodiment, the communication circuit 610 is configured to receive a second instruction sent by the power adapter, in which the second instruction is configured to ask whether a current voltage of the power adapter is suitable as a charging voltage of the quick charging mode; and to send a replying instruction of the second instruction to the power adapter, in which the replying instruction of the second instruction is configured to indicate that the current voltage of the power adapter is suitable, high or low.

In an embodiment, the communication circuit 610 is further configured to conduct a bidirectional communication with the power adapter through the data line in the USB interface such that the power adapter determines the charging current corresponding to the quick charging mode.

In an embodiment, the communication circuit 610 is configured to receive a third instruction sent by the power adapter, in which the third instruction is configured to inquire a maximum charging current supported currently by the mobile terminal 600; and to send a replying instruction of the third instruction to the power adapter, in which the replying instruction of the third instruction is configured to indicate the maximum charging current supported currently by the mobile terminal 600, such that the power adapter determines the charging current corresponding to the quick charging mode according to the maximum charging current.

In an embodiment, the communication circuit 610 is further configured to conduct a bidirectional communication with the power adapter through the data line in the USB interface in a process that the power adapter charges the mobile terminal 600 in the quick charging mode, such that the power adapter adjusts the charging current of the power adapter continuously.

In an embodiment, the communication circuit 610 is configured to receive a fourth instruction sent by the power adapter, in which the fourth instruction is configured to inquire a current voltage of a battery in the mobile terminal 600; and to send a replying instruction of the fourth instruction to the power adapter, in which the replying instruction of the fourth instruction is configured to indicate the current voltage of the battery in the mobile terminal 600, such that the power adapter adjusts the charging current of the power adapter continuously according to the current voltage of the battery.

In an embodiment, the communication circuit 610 is further configured to conduct a bidirectional communication with the power adapter through the data line in the USB interface in a process that the power adapter charges the mobile terminal 600 in the quick charging mode, such that the power adapter determines whether a poor contact occurs in the USB interface.

In an embodiment, the communication circuit 610 is configured to receive a fourth instruction sent by the power adapter, in which the fourth instruction is configured to inquire a current voltage of a battery in the mobile terminal 600; to send a replying instruction of the fourth instruction to the power adapter, in which the replying instruction of the fourth instruction is configured to indicate the current voltage of the battery in the mobile terminal 600, such that the power adapter determines whether the poor contact occurs in the USB interface according to the charging voltage of the power adapter and the current voltage of the battery.

In an embodiment, the communication circuit 610 is further configured to receive a fifth instruction sent by the power adapter, in which the fifth instruction is configured to indicate that the poor contact occurs in the USB interface.

Those skilled in the art can be aware that, units and algorithm steps in respective examples described with reference to embodiments disclosed in the present disclosure can be realized by electronic hardware or combination of computer software and electronic hardware. Executing these functions in hardware or software depends on particular applications and design constraint conditions of the technical solutions. Technology professionals can use different methods to realize the described functions for each particular application, which should be regarded as being within the scope of the present disclosure.

Those skilled in the art can understand clearly that, for convenience and simplicity of description, specific working process of the above system, devices and units may refer to corresponding process in the above method embodiments, which will not be elaborated herein.

It should be understood that, the system, devices and method disclosed in several embodiments provided by the present disclosure can be realized in any other manner. For example, the device embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A charging method, applied to a power adapter, the power adapter being coupled to a mobile terminal through a universal serial bus (USB) interface, a power line in the USB interface being configured by the power adapter to charge the mobile terminal, a data line in the USB interface being configured by the power adapter to conduct a bidirectional communication with the mobile terminal, and the power adapter supporting a common charging mode and a quick charging mode; the method comprising:
   conducting by the power adapter the bidirectional communication with the mobile terminal through the data line in the USB interface so as to determine to charge the mobile terminal in the quick charging mode;
   receiving by the power adapter an instruction sent by the mobile terminal, the instruction sent by the mobile terminal being configured to indicate that the current voltage of the power adapter is high or low; and
   adjusting by the power adapter a charging voltage according to the instruction sent by the mobile terminal, so as to charge the mobile terminal.

2. The method according to claim 1, wherein conducting by the power adapter the bidirectional communication with the mobile terminal through the data line in the USB interface so as to determine to charge the mobile terminal in the quick charging mode comprises:
   sending by the power adapter a first instruction to the mobile terminal, the first instruction being configured to ask the mobile terminal whether to start the quick charging mode; and
   receiving by the power adapter a replying instruction of the first instruction from the mobile terminal, the replying instruction of the first instruction being configured to indicate that the mobile terminal agrees to start the quick charging mode.

3. The method according to claim 2, further comprising:
   sending by the power adapter a first instruction to the mobile terminal after the power adapter outputs continuously an output current larger than or equal to a preset current to the mobile terminal for a preset period of time.

4. The method according to claim 1, further comprising:
   sending by the power adapter a third instruction to the mobile terminal, the third instruction being configured to inquire a maximum charging current supported currently by the mobile terminal;
   receiving by the power adapter a replying instruction of the third instruction sent by the mobile terminal, the replying instruction of the third instruction being configured to indicate the maximum charging current supported currently by the mobile terminal; and
   determining by the power adapter the charging current of the quick charging mode according to the replying instruction of the third instruction.

5. The method according to claim 1, further comprising:
   in a process that the power adapter charges the mobile terminal in the quick charging mode, conducting by the power adapter the bidirectional communication with the mobile terminal through the data line in the USB interface so as to adjust the charging current of the power adapter continuously.

6. The method according to claim 5, wherein conducting by the power adapter the bidirectional communication with the mobile terminal through the data line in the USB interface so as to adjust the charging current of the power adapter continuously comprises:
   sending by the power adapter a fourth instruction to the mobile terminal, the fourth instruction being configured to inquire a current voltage of a battery in the mobile terminal;
   receiving by the power adapter a replying instruction of the fourth instruction sent by the mobile terminal, the replying instruction of the fourth instruction being configured to indicate the current voltage of the battery in the mobile terminal; and
   adjusting by the power adapter the charging current of the power adapter to a charging current value corresponding to the current voltage of the battery.

7. The method according to claim 1, further comprising:
   in a process that the power adapter charges the mobile terminal in the quick charging mode, conducting by the power adapter the bidirectional communication with the mobile terminal through the data line in the USB interface so as to determine a path impedance from the power adapter to the mobile terminal, and to determine whether a poor contact occurs in the USB interface based on the path impedance from the power adapter to the mobile terminal;

when it is determined that the poor contact occurs in the USB interface, quitting by the power adapter the quick charging mode.

8. The method according to claim 7, wherein conducting by the power adapter the bidirectional communication with the mobile terminal through the data line in the USB interface so as to determine the path impedance from the power adapter to the mobile terminal, and to determine whether the poor contact occurs in the USB interface comprises:

sending by the power adapter a fourth instruction to the mobile terminal, the fourth instruction being configured to inquire a voltage of a battery in the mobile terminal;

receiving by the power adapter a replying instruction of the fourth instruction sent by the mobile terminal, the replying instruction of the fourth instruction being configured to indicate the voltage of the battery in the mobile terminal;

determining by the power adapter the path impedance from the power adapter to the battery according to a charging voltage of the power adapter and the voltage of the battery; and determining by the power adapter whether the poor contact occurs in the USB interface according to the path impedance from the power adapter to the battery, the path impedance of the mobile terminal and a path impedance of a charging circuit between the power adapter and the mobile terminal.

9. The method according to claim 7, further comprising:

sending by the power adapter a fifth instruction to the mobile terminal, the fifth instruction being configured to indicate that the poor contact occurs in the USB interface.

10. A charging method, applied to a mobile terminal, the mobile terminal being coupled to a power adapter through a universal serial bus (USB) interface, a power line in the USB interface being configured to charge the mobile terminal, a data line in the USB interface being configured by the mobile terminal to conduct a bidirectional communication with the power adapter, and the mobile terminal supporting a common charging mode and a quick charging mode; the method comprising:

conducting by the mobile terminal the bidirectional communication with the power adapter through the data line in the USB interface, such that the power adapter determines to charge the mobile terminal in the quick charging mode;

sending by the mobile terminal an instruction to the power adapter, the instruction sent by the mobile terminal being configured to indicate that the current voltage of the power adapter is high or low, such that the power adapter determines the charging voltage according to the instruction sent by the mobile terminal;

receiving by the mobile terminal the charging voltage from the power adapter so as to charge a battery in the mobile terminal.

11. The method according to claim 10, wherein conducting by the mobile terminal the bidirectional communication with the power adapter through the data line in the USB interface such that the power adapter determines to charge the mobile terminal in the quick charging mode comprises:

receiving by the mobile terminal a first instruction sent by the power adapter, the first instruction being configured to ask the mobile terminal whether to start the quick charging mode; and sending by the mobile terminal a replying instruction of the first instruction to the power adapter, the replying instruction of the first instruction being configured to indicate that the mobile terminal agrees to start the quick charging mode.

12. The method according to claim 11, further comprising:

performing a charging between the mobile terminal and the power adapter in the common charging mode; and after the power adapter determines that a charging period of time of the common charging mode is larger than a preset threshold, receiving by the mobile terminal the first instruction sent by the power adapter.

13. The method according to claim 10, further comprising:

receiving by the mobile terminal a third instruction sent by the power adapter, the third instruction being configured to inquire a maximum charging current supported currently by the mobile terminal; and sending by the mobile terminal a replying instruction of the third instruction to the power adapter, the replying instruction of the third instruction being configured to indicate the maximum charging current supported currently by the mobile terminal, such that the power adapter determines the charging current of the quick charging mode according to the replying instruction of the third instruction.

14. The method according to claim 10, further comprising in a process that the power adapter charges the mobile terminal in the quick charging mode, conducting by the mobile terminal the bidirectional communication with the power adapter through the data line in the USB interface such that the power adapter adjusts the charging current of the power adapter continuously.

15. The method according to claim 14, wherein conducting by the mobile terminal the bidirectional communication with the power adapter through the data line in the USB interface such that the power adapter adjusts the charging current of the power adapter continuously comprises:

receiving by the mobile terminal a fourth instruction sent by the power adapter, the fourth instruction being configured to inquire a current voltage of a battery in the mobile terminal; and sending by the mobile terminal a replying instruction of the fourth instruction to the power adapter, the replying instruction of the fourth instruction being configured to indicate the current voltage of the battery in the mobile terminal, such that the power adapter adjusts the charging current of the power adapter to a charging current value corresponding to the current voltage of the battery.

16. The method according to claim 10, further comprising:

in a process that the power adapter charges the mobile terminal in the quick charging mode, conducting by the mobile terminal the bidirectional communication with the power adapter through the data line in the USB interface, such that the power adapter determines a path impedance from the power adapter to the mobile terminal, and the power adapter determines whether a poor contact occurs in the USB interface based on the path impedance from the power adapter to the mobile terminal.

17. The method according to claim 16, wherein conducting by the mobile terminal the bidirectional communication with the power adapter through the data line in the USB interface, such that the power adapter determines the path impedance from the power adapter to the mobile terminal, and the power adapter determines whether the poor contact occurs in the USB interface comprises:

receiving by the mobile terminal a fourth instruction sent by the power adapter, the fourth instruction being configured to inquire a current voltage of a battery in the mobile terminal; and sending by the mobile terminal a replying instruction of the fourth instruction to the power adapter, the replying instruction of the fourth instruction being configured to indicate the current voltage of the battery in the mobile terminal, such that the power adapter determines the path impedance from the power adapter to the mobile terminal, according to a charging voltage of the power adapter and the current voltage of the battery, and the power adapter determines whether the poor contact occurs in the USB interface based on the path impedance from the power adapter to the mobile terminal, a path impedance of the mobile terminal, and a path impedance of a charging circuit between the power adapter and the mobile terminal.

18. The method according to claim 16, further comprising:

receiving by the mobile terminal a fifth instruction sent by the power adapter, the fifth instruction being configured to indicate that the poor contact occurs in the USB interface.

19. A power adapter, coupled to a mobile terminal through a universal serial bus (USB) interface, a power line in the USB interface being configured by the power adapter to charge the mobile terminal, a data line in the USB interface being configured by the power adapter to conduct a bidirectional communication with the mobile terminal, and the power adapter supporting a common charging mode and a quick charging mode; the power adapter comprising:

a communication circuit, configured to conduct the bidirectional communication with the mobile terminal through the data line in the USB interface so as to determine to charge the mobile terminal in the quick charging mode, receive an instruction sent by the mobile terminal, the instruction sent by the mobile terminal being configured to indicate that the current voltage of the power adapter is high or low;

a current adjusting circuit, configured to adjust a charging voltage according to the instruction sent by the mobile terminal, so as to charge the mobile terminal.

20. The power adapter according to claim 19, wherein the communication circuit is further configured to conduct the bidirectional communication with the mobile terminal in a process that the power adapter charges the mobile terminal in the quick charging mode, to determine a path impedance from the power adapter to the mobile terminal, and to determine whether a poor contact occurs in the USB interface based on the path impedance from the power adapter to the mobile terminal.

* * * * *